United States Patent [19]

Miyazaki et al.

[11] 4,001,785

[45] Jan. 4, 1977

[54] APPARATUS FOR MONITORING CHANGES OF MULTIPLE INPUTS

[75] Inventors: Ken Miyazaki; Kazutoshi Takahashi, both of Yokohama; Mamoru Omino, Musashino, all of Japan

[73] Assignee: Asahi Kasei Kogyo Kabushiki Kaisha, Osaka, Japan

[22] Filed: Feb. 14, 1975

[21] Appl. No.: 550,076

[30] Foreign Application Priority Data

Feb. 15, 1974 Japan .............................. 49-18944

[52] U.S. Cl. ........................ 340/172.5; 340/213 Q; 235/151.1

[51] Int. Cl.[2] ........................................ G06F 11/00

[58] Field of Search .................... 340/172.5, 213 Q; 445/1; 235/151.1

[56] References Cited

UNITED STATES PATENTS

| | | | |
|---|---|---|---|
| 2,883,255 | 4/1959 | Anderson | 340/213 Q |
| 2,901,739 | 8/1959 | Freitas | 340/213 Q |
| 3,008,131 | 11/1961 | Einsel et al. | 340/213 Q |
| 3,147,370 | 9/1964 | Lowman | 340/213 Q |
| 3,247,498 | 4/1966 | Sadvary et al. | 340/172.5 X |
| 3,406,387 | 10/1968 | Werme | 340/172.5 X |
| 3,609,669 | 9/1971 | Weiss et al. | 340/172.5 |
| 3,767,901 | 10/1973 | Black et al. | 235/151 |
| 3,824,387 | 7/1974 | Garst | 235/151.1 |
| 3,826,904 | 7/1974 | Leonard et al. | 235/151.1 |

*Primary Examiner*—Mark E. Nusbaum
*Attorney, Agent, or Firm*—Sughrue, Rothwell, Mion, Zinn & Macpeak

[57] ABSTRACT

A scanning circuit successively scans a multiplicity of input points, producing respective binary signals representing corresponding status in a chemical or electrical industry. The scanned output is stored in an update memory at an address which corresponds to each of the input points. Each of the scanned output is also compared with a signal read out from this memory which stores the result of the previous scanning, and in the absence of coincidence therebetween, the address corresponding to that input point and its associated status are stored in a temporary store. A second or main memory is accessed by an address signal which comprises the address of that input point and its associated status which are read out from the temporary store, so as to supply information representative of that input point, for example, the name of a particular instrument and its associated status, to a recorder for the purpose of recording.

8 Claims, 28 Drawing Figures

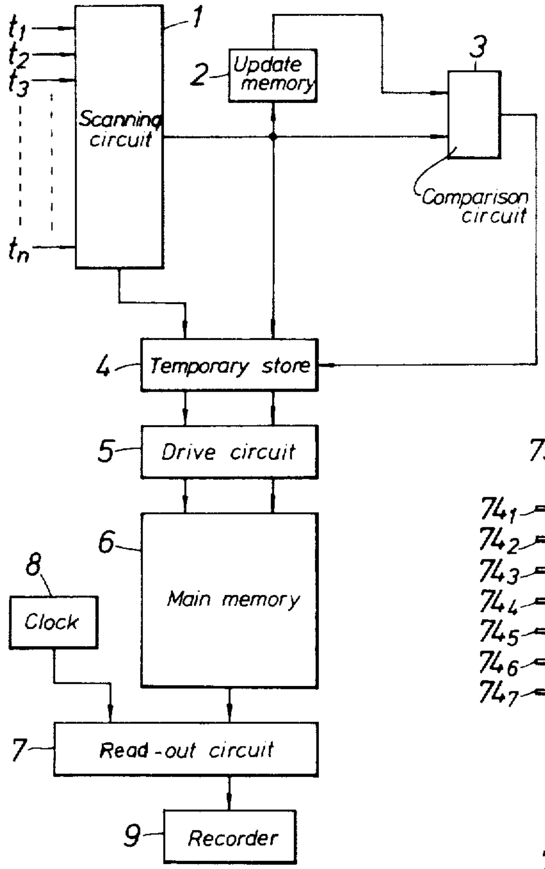
FIG_1
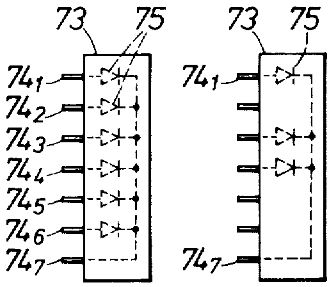
FIG_6
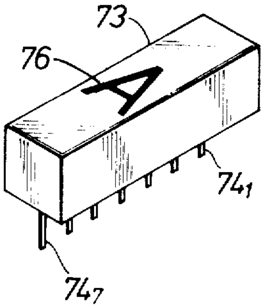
FIG_6A
| 100 | 101 | 102 |
|---|---|---|
| 09:31 | 4DR-PH | ON |
| 10:04 | 4DR-PH | OFF |
| 11:59 | 4DR-LL | ON |
| 12:03 | 4AIR-H | ON |
| 12:05 | 4AIR-H | OFF |
| 12:06 | 4DR-LL | OFF |
| 18:15 | 4AIR-H | ON |
| 18:17 | 4AIR-H | OFF |
FIG_8

NO.1
NO.2
NO.3
NO.4
NO.5
NO.6
NO.7
NO.8
NO.9
NO.10
NO.11
NO.12
NO.13
NO.14
NO.15
NO.16

APPARATUS FOR MONITORING CHANGES OF MULTIPLE INPUTS

BACKGROUND OF THE INVENTION

The invention relates to an apparatus for monitoring a change in the status of binary information from a multiplicity of input points.

A chemical, textile, petroleum, electrical or gas industry involves processes and systems which contains a multiplicity of sites to be monitored. In these processes, an alarm signal from any site is fed to a centralized monitoring system. This renders it difficult to determine which alarm has operated if one of the alarms restores a normal condition immediately after it once operated. Such a difficulty can be avoided by an alarm unit which provides a self-holding function in response to an alarm signal once generated. However, in this instance, the alarm unit continues to operate even after the signal restores its normal level. It is desirable that an indication of the alarm be automatically interrupted upon restoring to a normal level, and therefore the self-holding feature is not desirable. In a system which is susceptible to a chain reaction in that the occurrence of a single abnormal condition induces additional abnormalities, it will be useful for the remedy, re-starting or the analysis of an accident to know the sequence in which the alarm signals are generated, or more specifically, the sequence in which the abnormalities occur and propagate as well as the time interval between successive abnormalities. During the starting and shutting down procedure of the process, it is necessary to perform sequential operations in a given order, and a wrong procedure may result in an accident particularly during the starting and shutting down. Under such situation, a record of the procedure employed will facilitate locating a wrong operation, enabling an immediate action to be taken under certain circumstances. While a conventional process control has used a record of information concerning a multiplicity of process variables, there has been no system for recording the presence or absence of the abnormality of such variables. This may be explained by the fact that such abnormality should not occur frequently, and actually occurs only rarely. For this reason, it is not favorable in respect of the process economy that the recorder be normally maintained operative.

It is an object of the invention to provide an apparatus for monitoring a change in the status of a multiplicity of input points, occurring in the form of a binary information, which records any change occurred only when it occurs, permits an effective use of a recording medium and provides a legible record output.

It is another object of the invention to provide an apparatus for monitoring a change in a multiplicity of inputs which permits a high speed survey of the varying status of a multiplicity of input points.

It is a further object of the invention to provide an apparatus for monitoring a change in a multiplicity of inputs which achieves an accurate record of the sequence in which a change in the status of a multiplicity of input points occurs.

It is an additional object of the invention to provide an apparatus for monitoring a change in a multiplicity of inputs which produces a record which permits, at one glance, the recognition of characters, symbols or numerals indicative of the input points, the prevailing status of the input points as well as the time at which the record is made.

It is still another object of the invention to provide an apparatus for monitoring a change in a multiplicity of inputs which permits the form of a record to be established and modified in a simple and free manner.

It is a still further object of the invention to provide an apparatus for monitoring a change in a multiplicity of inputs which is simple in operation and maintenance, and which can be handled by unskilled persons.

SUMMARY OF THE INVENTION

In accordance with the invention, a scanning circuit successively scans a multiplicity of input points, and the scanned output is stored in an update memory at an address corresponding to each of the input points. During a particular cycle, each of the scanned output is compared against the content of memory which is stored during the previous cycle at the address corresponding to the identical input point. When a change is recognized in the status of that input point as a result of the comparison, this change is detected. A main memory maintains information indicative of each of the input points and its associated status. When the comparison circuit detects that a change occurred in a particular input point, an access is made to the main memory at the address corresponding to that input point so as to supply characters, symbols and the like representative of the input point as well as the prevailing status thereof to a printer, for example, for the purpose of recording.

Thus, in accordance with the invention, only when a change occurs in the status of the particular one of a multiplicity of input points, that change is recorded together with the changed status in a manner to permit an easy recognition of that particular input point, namely, to permit a direct reading of the consecutive number of the particular alarm unit, the name of a control valve or the like. Thus, the recorded content can be immediately printed out. Where the multiplicity of input points are interrelated with each other, the record permits an immediate determination of how a change in the status of a particular point resulted in a chain reaction. Importantly, such an arrangement is achieved in a simple manner without the use of a complex equipment such as an electronic computer or the like.

When the comparison circuit detects a change in the status of a particular input point, an address information corresponding to the particular input point is not directly used to make an access to the main memory, but the address information and the status of that input point are once stored in the temporary store, from which a read-out is made to provide an access to the main memory for the purpose of print-out, and upon the completion of the print-out, a read-out is again made from the temporary store. In this manner, the data from those input points in which a change occurred are successively passed to the temporary store regardless of the completion of the print-out operation, thereby permitting a high speed scanning of the input points and also permitting a sequential inputting operation of successive abnormalities which might occur at a high speed to assure an accurate analysis. The main memory comprises a plurality of memory elements, each of which is wired so as to output a coded signal corresponding to a character, symbol or the like, thereby permitting a free modification of the stored content by an unskilled person. When the main memory is accessed at an address corresponding to a particular input point, information indicative of that input point, the prevailing status thereof and the clock time when the access is made are simultaneously outputted, and such output is maintained during the interval of access so as to enable the completion of print-out of such information along one line, whereupon a next access is made to the main memory, thus eliminating the need for a buffer memory which has the capacity of storing an amount of read-out signal corresponding to one line of the printing operation. If the printer has a sufficiently high printing speed in comparison with the rate at which a change in the status of the input points occurs, the temporary store may be eliminated.

BRIEF DESCRIPTION OF DRAWINGS

FIG. 1 is a block diagram showing one embodiment of the apparatus for monitoring a change in a multiplicity of inputs constructed in accordance with the invention;

FIG. 6 is a schematic view illustrating one example of a memory element;

FIG. 6A is a perspective view of the memory element;

FIG. 8 is a chart illustrating one example of a record; and

DETAILED DESCRIPTION OF PREFERRED EMBODIMENTS

Figure 2:
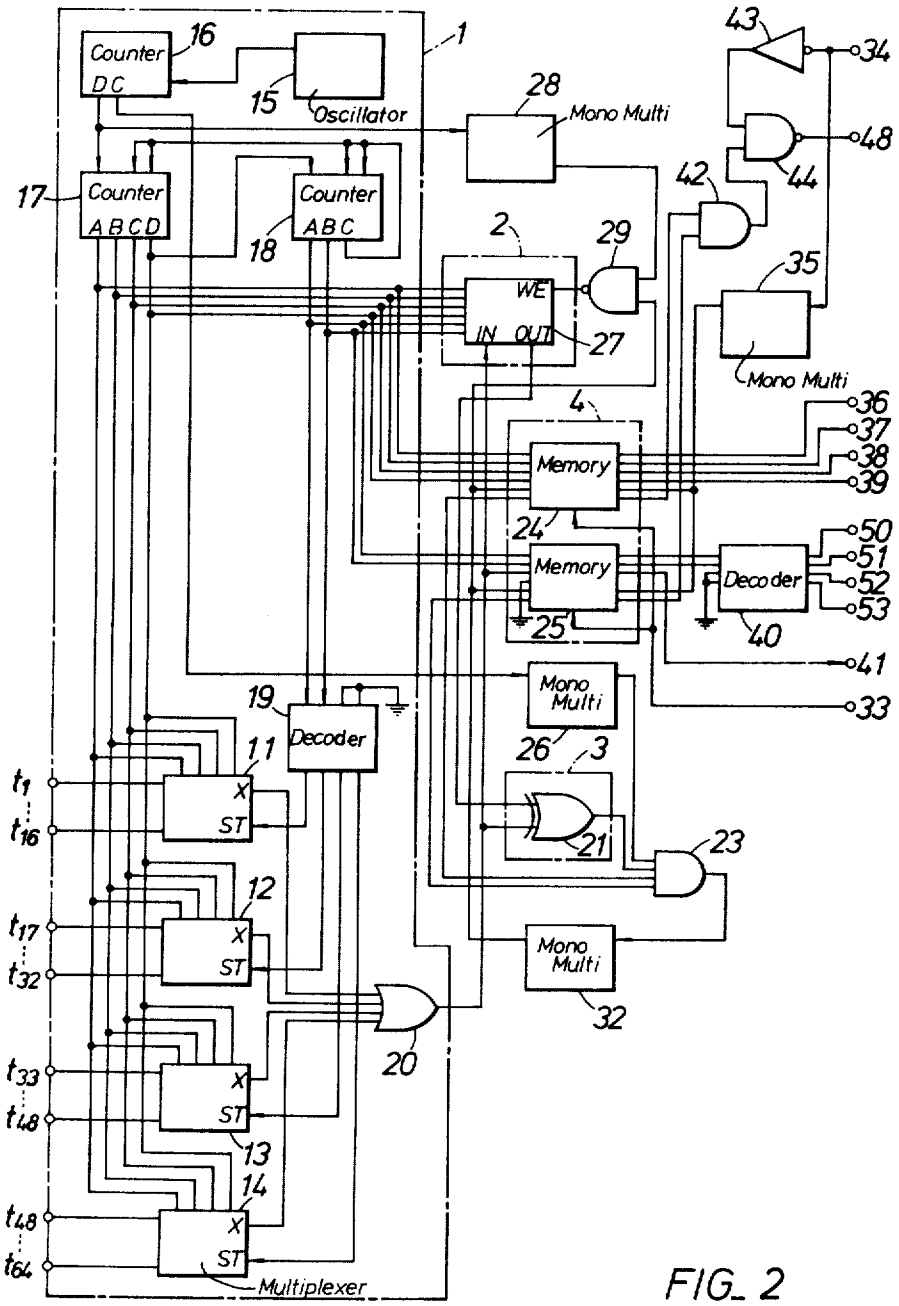
FIG. 2 is a detailed circuit diagram of the scanning circuit, update memory, comparison circuit and temporary store used in the apparatus of FIG. 1.

Referring to FIG. 1, the principle underlying the apparatus for monitoring a change in a multiplicity of inputs according to the invention will be described first.

A plurality of input points $t_1$ to $t_n$ correspond to respective sites of a single process, and assumes either status 0 or 1 of a binary signal depending on the status being monitored. These input points $t_1$ to $t_n$ are successively scanned by a scanning circuit 1, and the scanned output is stored in an update memory 2 at an address corresponding to a particular input point being scanned. Before being stored in the memory 2, the scanned output is compared in a comparison circuit 3 against the content of the update memory 2 which is stored at an address corresponding to the same input point and indicative of the result of the previous scan, and it is determined whether or not there is a change between the scanned outputs of the same input point between the previous and the current scans. If a coincidence is found between the both inputs, the scan proceeds to the next step. However, in the event of uncoincidence being detected, the address indicative of that input point and the prevailing status thereof are stored in a temporary store 4. The content of the temporary store 4 is sequentially read out into a drive circuit 5 in the sequence of entry, and the output of the drive circuit 5 is used to make an access to a main memory 6. In response to an address indicative of particular input point being fed from the drive circuit 5, the main memory 6 supplies to a circuit 7 a coded signal defining characters, symbols, numerals or the like which are representative of that input point as well as a coded signal defining characters, symbols or the like indicative of the prevailing status of that input point. If required, a signal indicative of a clock time at which the access is made to the main memory can be supplied to the read-out circuit 7 from a clock 8. When the content in the read-out circuit 7 is recorded by a recorder such as a printer 9, for example, data having the next priority is read out from the temporary store 4 into the drive circuit 5. The temporary store 4 can be eliminated if the recording speed by the recorder 9 is sufficiently high in comparison with the rate with which the scanning circuit 1 scans from one input point to another.

Figures 3A, 3B, 3C, 3D, 3E, 3F, 3G, 3H, 3I, 3J, 3K, 3L, 3M, 3N, 3O, 3P, 3Q, 3R, 3S:
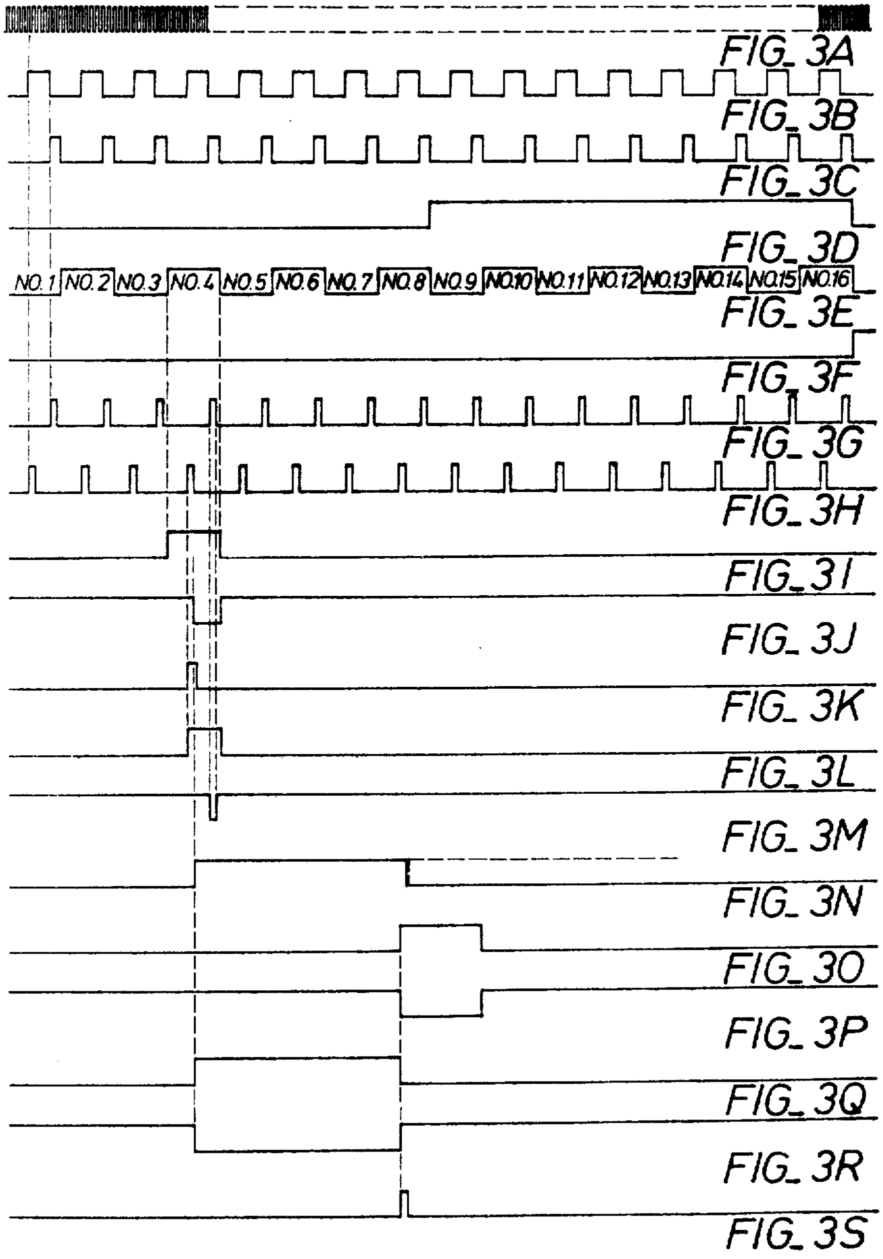
FIGS. 3A to 3S graphically show the waveforms appearing in the various parts of FIG. 2.

FIG. 2 shows a specific example of the scanning circuit 1, update memory 2, comparison circuit 3 and temporary store 4. In this Figure, the scanning circuit 1 is shown as successively scanning 64 input points $t_1$ to $t_{64}$ which are connected in a distributed manner with the input terminals of four multiplexers 11 to 14, each having 16 input terminals. Pulse from an oscillator 15, having a waveform such as shown in FIG. 3A, is divided by ten in a decimal counter 16, the divided output of which, as shown in FIG. 3C, is fed to a counter 17 having a scale of 16. A carry output (FIG. 3D) of the counter 17 is fed to a counter 18 having a scale of four. The counter 17 has four counting stages, the outputs A, B, C and D of which are supplied to each control signal input terminal of the multiplexers 11 to 14. Each of the multiplexers 11 to 14 outputs each one of the signals applied to its first to sixteenth input terminal for each step in the counter 17 sequentially, depending on the supply of the control signals thereto (FIG. 3E). It is to be noted that in FIG. 3E, a change in the level does not represent a change in the status of an input point, but indicates a switching from one input point to another. The counter 18 has its outputs A and B from the respective counter stages connected to a decoder 19, producing a sequential output from its output terminals 1 to 4. These outputs are supplied to each start terminal ST of the multiplexers 11 to 14, respectively. Thus, when the counters 17 and 18 start their counting operation from their reset condition, the multiplexer 11 alone will become operative initially as shown in FIG. 3F, and the signals applied to its input terminals or input points $t_1$ to $t_{16}$ will successively appear at the output of the multiplexer 11 for each step in the counter 17. When the counter 17 reaches a full count and a step is made in the counter 18, the multiplexer 12 alone will become operative, whereby the signals on the input points $t_{11}$ to $t_{32}$ will appear sequentially at the output of this multiplexer for each step in the counter 17. A similar operation is repeated until the signal on the input point $t_{64}$ appears at the output of the multiplexer 14, whereupon the next clock causes the counters 17 and 18 to be reset, thus enabling the signal on the input point $t_1$ to appear again at the output of the multiplexer 11. The respective outputs from the multiplexers 11 to 14 pass through an OR circuit 20 to provide an output from the scanning circuit 1.

The output of the scanning circuit 1 or OR circuit 20 is fed to an exclusive OR circuit 21 which constitutes the comparison circuit 3. The other input to the circuit 21 is supplied by an output read out from the update memory 2. The circuit 21 outputs 0 when a coincidence occurs between the both inputs, and outputs 1 for an uncoincidence therebetween. The output of the circuit 21 is fed to an AND gate 23 which also receives "input ready" signals from first-in first-out storages 24 and 25 which together constitute the temporary store 4, and which also receives an output (FIG. 3H) from a monostable multivibrator 26 which is driven by an output C (FIG. 3B) from the third stage of the decimal counter 16. The update memory 2 is formed by a random access memory 27 having a signal input terminal to which the output of the scanning circuit 1 is supplied, and which is supplied with the outputs A, B, C and D of the counter 17 as well as the outputs A and B of the counter 18 as an address signal. The output from the final stage of the decimal counter 16 or the clock shown in FIG. 3C drives a monostable multivibrator 28, the output of which (FIG. 3G) is fed through a NAND gate 29 to a "write terminal of the update memory 27. When the output from the NAND gate 29 is 1, a read-out operation is made from the memory 27 at an address which is specified at that time, and when the output from the gate 29 is 0, an entry is effected into this memory at the corresponding address. The output of the NAND gate 29 is normally 1, so that the memory 27 is normally maintained in a read-out condition. As a consequence, a signal for choosing a particular one of the input points being scanned, namely the outputs from the counters 17 and 18 cause the status of the corresponding input point which has been scanned during the previous scan to be read out from the memory 2 for comparison with the status of that input point during the current scan in the comparison circuit 3. As indicated in FIG. 3H, the result of the comparison is detected at an intermediate point in time of an interval during which a particular input point is being chosen. When a coincidence is found between the both inputs, the output of the AND gate 23 will be 0, while the output will be 1 for an uncoincidence. An uncoincidence output drives a monostable multivibrator 32. The illustration in FIG. 3 assumes that a coincidence occurs between the status of the current scan and the status of the previous scan for the input points $t_1$ to $t_3$, but that a change in the status occurs for the input point $t_4$ between the previous and current scans, so that the output from the comparison circuit 3 becomes 1 as indicated in FIG. 3I. At this time, the output from the monostable multivibrator 26 (FIG. 3H) is passed through the AND gate 23 to produce an output as shown in FIG. 3K, which drives the monostable multivibrator 32, causing an output as shown in FIG. 3L therefrom, which is in turn applied as a control signal to both storages 24, 25 of the temporary store. During the duration of the control signal, the "input ready" signals from the storages 24, 25 return to 0 as indicated In FIG. 3J, while the outputs A, B, C and D of the counter 17 which are applied to the storage 24 are entered into this storage simultaneously with an entry of the outputs A and B of the counter 18 as well as the output of the scanning circuit 1 into the storage 25. Thus, if a change occurs in the status between the previous and current scans, an address indicative of a corresponding input point and the prevailing status or the status during the current scan are stored in the temporary store 4. The output of the multivibrator 32 is also applied to the NAND gate 29, whereby toward the end of a particular scanning interval, when a pulse (FIG. 3G) from the multivibrator 28 is applied to the gate 29, the output of the gate 29 returns to 0 as indicated in FIG. 3M, thereby causing an entry of the prevailing status of the input point $t_4$ into the update memory 27 at an address corresponding to the input point $t_4$. Thus, an entry into the update memory 2 takes place only when a change occurs in the status between the previous and current scans. When no change is found, the memory 2 maintains a previous status. As mentioned previously, the temporary store 4 may comprise first-in first-out storages such as, for example, an integrated semiconductor circuit Am 3341 manufactured by Advanced Micro Devices in the United States. When an entry into the storage is made, an internal clock causes a stored information to be automatically shifted toward the output side so as to assure a read-out operation in which data is read out in the sequence they are entered. Under the condition that the storages 24 and 25 store information, an "output ready" signal (FIG. 3N) indicating that a read-out operation may be effected changes to 1. It is to be noted that the storages 24 and 25 are initially reset by a signal from a terminal 33 when the power is turned on. Alternatively, the temporary store 4 may comprise a conventional random access memory which is controlled externally to provide a read-out in the sequence of entry of respective data.

Figure 7:
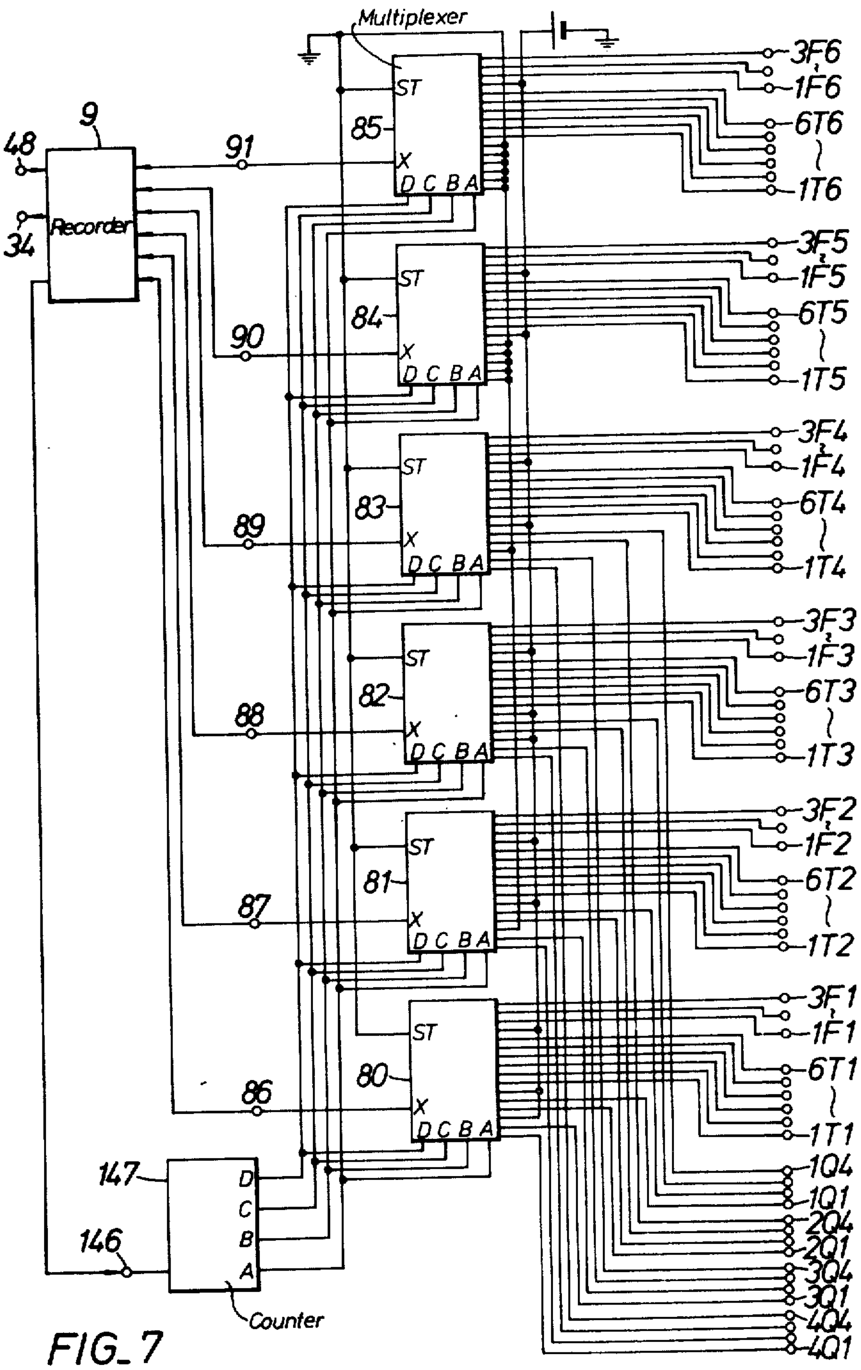
FIG. 7 is a diagram showing one example of the drive circuit.

If a record or print-out ready signal which is applied from a control unit within a recorder 9, shown in FIG. 7, to a terminal 34 is 0 as indicated in FIG. 3O when information is entered into the storages 24 and 25 and the "output ready" signals therefrom are 1 as indicated in FIG. 3N, the print-out ready signal is applied through an invertor 45 to a NAND gate 44, as indicated by FIG. 3P. The gate 44 also receives the "output ready" signals from the storages 24 and 25 through an AND gate 42, so that a record or print-out instruction 0 is applied from the NAND gate 44 to an output terminal 48, as shown in FIG. 3R, this signal being fed to the control unit within the recorder 9 shown in FIG. 7. At this time, an address signal contained in a set of information which indicates a particular input point is supplied from the output of the storage 24 to a set of terminals 36 to 39, while an address signal from the storage 25 is supplied to a decoder 40 which produces a decoded output on a set of terminals 50 to 53. The status signal is supplied to a terminal 41. When the information indicative of the input point and its status are printed out based on these data, a record or printout complete signal 1 is applied to the terminal 34, which signal drives a monostable multivibrator 35. The output of this multivibrator 35, as indicated in FIG. 3S, causes an erasure of the final stage of the storages 24, 25. If this results in a complete removal of stored information from the storages 24, 25, the "output ready" signal will become 0 as indicated in FIG. 3N. If a stored information remains within the storages 24 and 25, the "output ready" signal will return to 1 immediately, as indicated by dotted line, for outputting a stored information which has been shifted into the final stage. Subsequently, when the signal applied to the terminal 34 becomes 0 to indicate that the recorder is ready for operation, another record operation will be performed provided a stored information remains within the storages 24 and 25.

Figure 4:
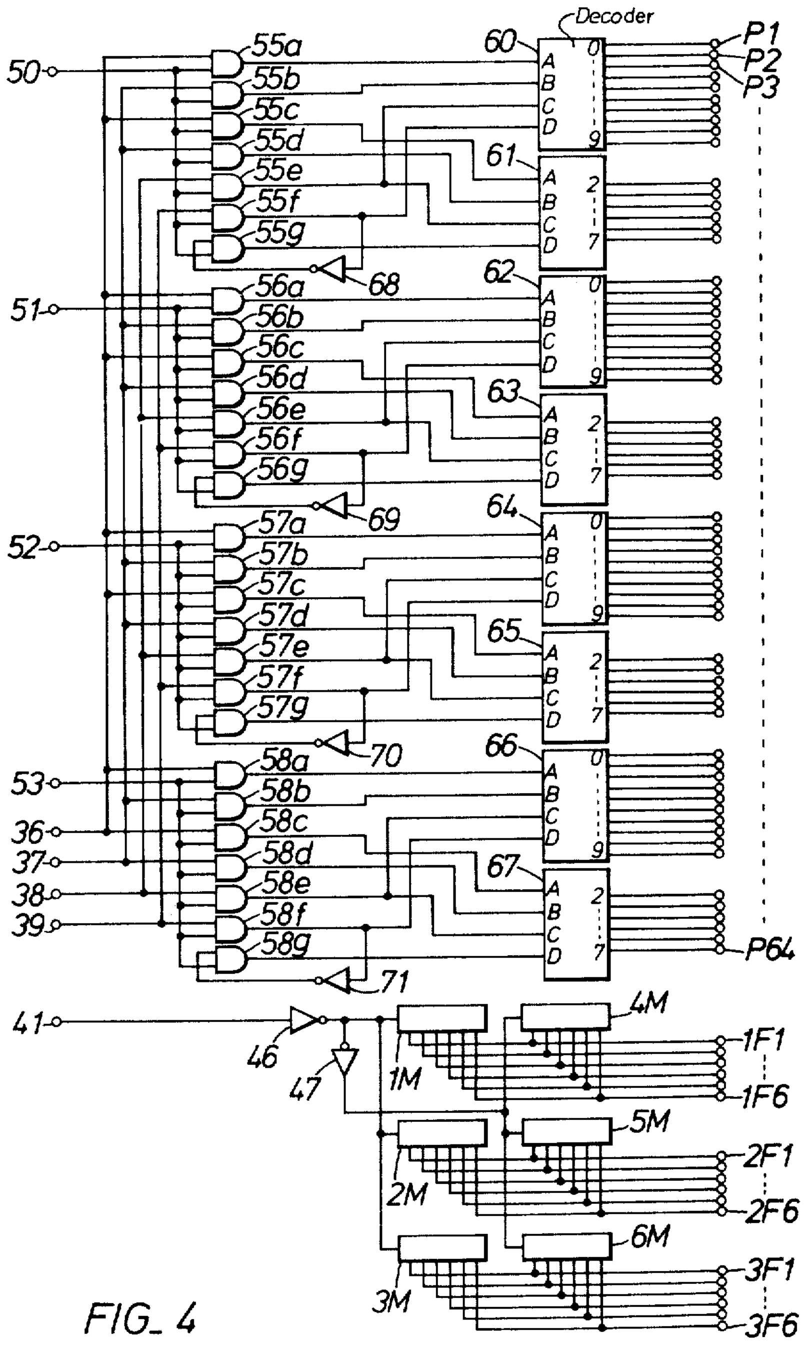
FIG. 4 is a detailed circuit diagram of the read-out circuit and the main memory used in the apparatus of FIG. 1.

FIG. 4 shows the read-out circuit 5 and a portion of the main memory 6. The output terminals 50 to 53 of the decoder 40 shown in FIG. 2 are connected with a plurality of decoder selection gates 55*a* to 55*g*, 56*a* to 56*g*, 57*a* to 57*g* and 58*a* to 58*g*, respectively. The output terminal 36 of the storage 24 is connected with the gates 55*a*, 55*c*, 56*a*, 56*c*, 57*a*, 57*c*, 58*a* and 58*c* while the output terminal 37 is connected with the gates 55*b*, 55*d*, 56*b*, 56*d*, 57*b*, 57*d*, 58*b* and 58*d*. The output terminals 38 and 39 are connected with the gates 55*e* to 58*e* and the gates 55*f* to 58*f*, respectively. The outputs of the gates 55*a*, 55*b*, 55*e* and 55*f* are connected with the input terminals A, B, C and D of a decimal decoder 60 while the outputs of the gates 55*c*, 55*d*, 55*e* and 55*g* are connected with the input terminals A, B, C and D of a decimal decoder 61, respectively. In the similar manner, the outputs of the gates 56*a* to 56*g* are connected with decoders 62, 63; the outputs of the gates 57*a* to 57*g* with decoders 64, 65; and the outputs of the gates 58*a* to 58*g* with decoders 66, 67, respectively. The output of the gate 55*f* is connected through an invertor 68 for input to the gate 55*g*. Similarly, the respective outputs from the gates 56*f*, 57*f* and 58*f* are connected through invertors 69, 70 and 71 for input to the gates 56*g*, 57*g* and 58*g*, respectively. When the signal at the output terminal 50 assumes 1, the decoders 60 and 61 become effective while the remaining decoders 62 to 67 remain ineffective. A binary signal comprising four bits appearing at the terminals 36 to 39 is outputted to a corresponding one of output terminals 0 to 9 of the decoder 60 when the binary signal represents a decimal number from 0 to 9, while a decimal number from 8 to 15 will produce 1 at the terminal 39, which is supplied as 0 by the invertor 68 to the terminal D of the decoder 61, whereby a decimal input from 10 to 15 will produce an output at a corresponding one of output terminals 2 to 7 of the decoder 61. When 1 appears at the terminal 51, the decoders 62, 63 are selected to perform a similar operation. In this manner, an output is obtained at one of terminals $P_1$ to $P_{64}$ connected with the respective sixteen output terminals of the decoders 60 to 67, depending on an address of an input point $t_1$ to $t_{64}$ which is read out from the temporary store 4, the output on the P terminals being effective to make an access to the main memory 6 at a corresponding address.

On the other hand, a signal from the terminal 41 indicative of the status of an input point is passed through an invertor 46 to drive memory elements 1M to 3M, and the output of the invertor 46 is passed through another invertor 47 to drive memory elements 4M to 6M. Six output terminals associated with the memory elements 1M and 4M are connected with terminals 1F1 to 1F6; six output terminals associated with the memory elements 2M and 5M are connected with terminals 2F1 to 2F6; and six output terminals associated with the memory elements 3M and 6M are connected with terminals 3F1 to 3F6, respectively. For example, when the memory elements 1M to 3M are driven, six bit binary codes indicative of the content stored in the respective elements are produced on the terminals 1F1 to 1F6, 2F1 to 2F6 and 3F1 to 3F6, respectively. Similarly, when the memory elements 4M to 6M are driven, six bit binary codes indicative of the content stored in the respective elements appear on the terminals 1F1 to 1F6, 2F1 to 2F6 and 3F1 to 3F6, respectively.

Figure 5:
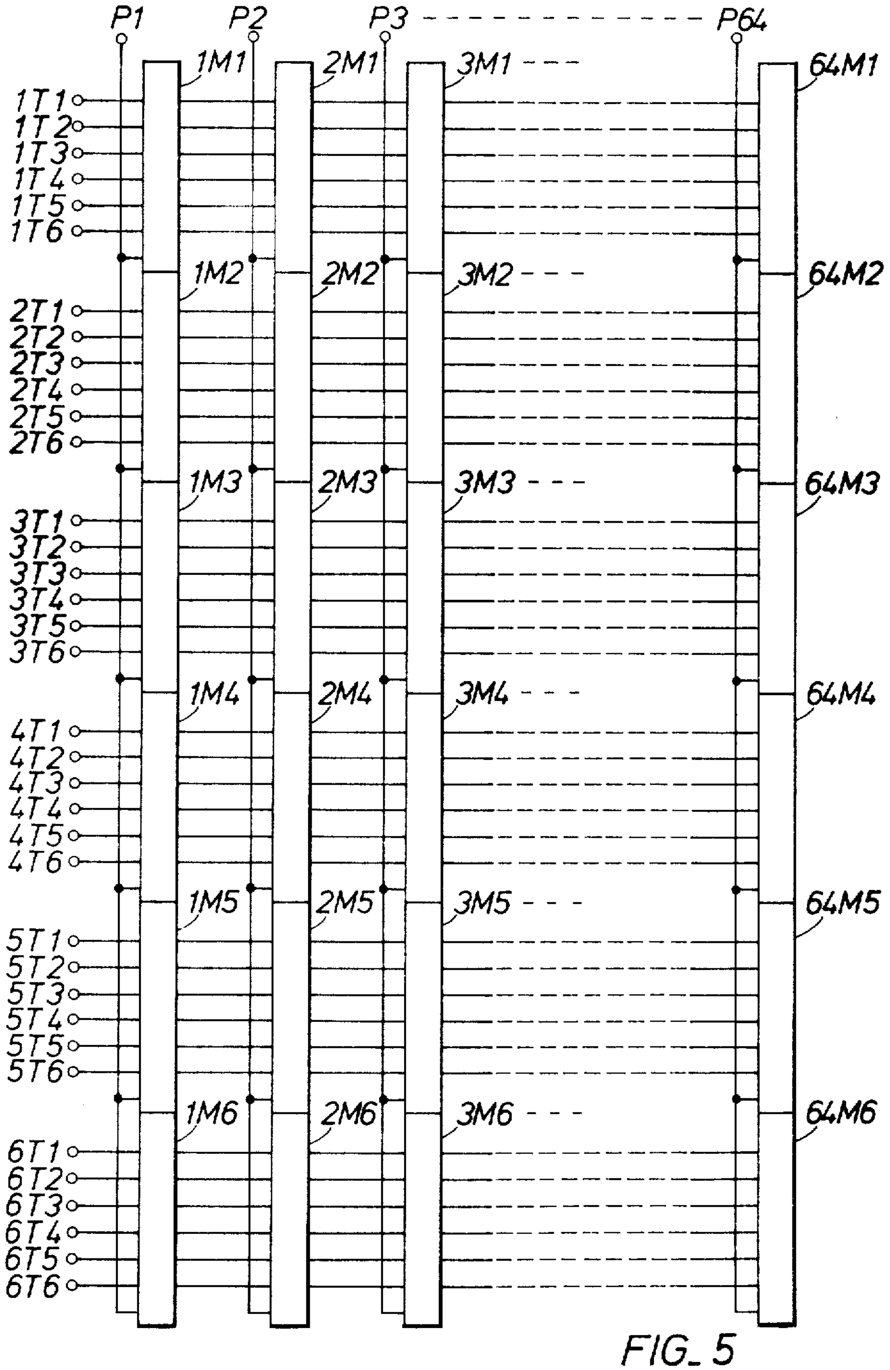
FIG. 5 is a diagram illustrating one portion of the main memory.

The portion of the main memory 6 which stores information representative of the respective input points is shown in FIG. 5 wherein the output terminals $P_1$ to $P_{64}$ of the decoders 60 to 67 are each connected with six of memory elements 1M1 to 1M6, ... 64M1 to 64M6, respectively. Each of these memory elements stores a six bit binary code which represents a numeral, a letter or a symbol. A combination of six elements corresponding to one of the terminals $P_1$ to $P_{64}$ providing a coded information representative of the designation of one of sixtyfour input points. The six output terminals of the memory elements 1M1 to 64M1 which are located in a same row in the 64 × 6 array of the memory elements are connected with common terminals 1T1 to 1T6; the six output terminals of the memory elements 1M2 to 64M2 are connected with common terminals 2T1 to 2T6; and similarly other memory elements are connected with terminals 3T1 to 3T6 . . . 6T1 to 6T6, respectively.

Each of the memory elements 1M1 to 64M6 may comprise a block 73 of an insulating material as shown in FIG. 6, and seven terminal members $74_1$ to $74_7$ are spaced apart with a given interval along one surface thereof. The terminal member $74_7$ is connected through a diode 75 with one or more of the terminal members $74_1$ to $74_6$. The terminal member $74_7$ represents an input terminal of the memory elements and is connected with any one of the terminals $P_1$ to $P_{64}$, while the terminal members $74_1$ to $74_6$ are connected with the output terminals 1T1 to 1T6 ... 6T1 to 6T6, respectively. When a certain memory element is selected, its terminal member $74_7$ is grounded, whereby the diode 75 connected thereto conducts, producing a six bit binary code on the terminal members $74_1$ to $74_6$ as a result of distinction between those terminal members which are connected with the diode 75 and those not. By way of example, FIG. 6A shows a designation 76 of A representative of content stored by the memory element on the surface of the insulating block 73 which is opposite to that along which the terminal members are provided, thereby permitting an immediate recognition of the stored content by visual inspection. If required, the stored content of the main memory 6 can be freely changed by inserting the terminals $74_1$ to $74_7$ of the memory element into a printed substrate. The memory elements 1M to 6M shown in FIG. 4 which indicate the status of the input points can be similarly constructed.

The information which is read out from the main memory 6 is passed through the drive circuit 7 to be supplied to a recorder, for example, a printer 9. The drive circuit 7 can be constructed as shown in FIG. 7. The terminals 1T1 to 1T6 . . . 6T1 to 6T6 shown in FIG. 5 are connected with the input terminals of multiplexers 80 to 85 in a manner so that the first bit T1 to sixth bit T6 of each set are supplied one each of the multiplexers. In the similar manner, the terminals 1F1 to 1F6 . . . 3F1 to 3F6 shown in FIG. 4 are connected with the multiplexers 80 to 85 in a manner so that the first bit F1 to sixth bit F6 are supplied to the respective multiplexers. The clock 8 provides a clock time indicating signal, the unit's minute signal of which is applied to terminals 1Q1 to 1Q4 which are connected with the multiplexers 80 to 83. In the similar manner, terminals 2Q1 to 2Q4 to which ten's minute signal is applied, terminals 3Q1 to 3Q4 to which a unit's hour signal is applied and terminals 4Q1 to 4Q4 to which a ten's hour signal is applied are connected with the multiplexers 80 to 83, respectively. Empty terminals are provided between those input terminals of the multiplexers 80 to 85 to which information representative of the designation of the input point is supplied and those to which information indicative of the status of that input point is supplied, between those terminals to which the hour signal and the ten's minute signal are supplied, and between those terminals to which the hour signal and the information indicative of the designation of the input point are supplied, thereby allowing a space to be formed between printed characters. On the other hand, each time a print instruction is applied to the terminal 146 of the recorder 9, a counter 147 having a scale of 16 advances one step. The output A, B, C and D from the respective stages of the counter 147 are supplied to the multiplexers 80 to 85 as control signals. Thus, for each step of the counter 147, one input terminal from each of the multiplexers 80 to 85 is selected. For example, signals constituting the first digit in the information representative of the designation of the input point, or signals on the terminals 1T1 to 1T6 are simultaneously outputted. Upon a further step of the counter 147, the signals on the terminals 2T1 to 2T6 which constitute the second digit in the information indicative of the input point are simultaneously outputted. In this manner, the coded signal for each digit of the information representative of the input point, the coded signal for each digit of the information indicative of the status of the input point, and the coded signal for each digit of the clock time information are sequentially obtained at the output terminals 86 to 91 of the multiplexers 80 to 85. The signal from the clock 8 may be in the form of the outputs from successive stages of a frequency divider connected with the output of a stable oscillator, the stages providing a second signal, a minute signal and an hour signal.

The printer 9 may be a conventional one. It produces a print instruction each time one letter, numeral or symbol corresponding to the coded signal from the terminals 86 to 91 of the drive circuit 7 is printed out, the print instruction being applied to the terminal 146. When a row of characters, namely six digits of information representative of the designation of an input point, three digits of information indicative of the status of that input point and four digits of a clock information are printed, the printer produces one row print complete signal, which is applied to the terminal 34 shown in FIG. 2.

With the apparatus for monitoring a change in a multiplicity of inputs constructed in accordance with the invention, a multiplicity of input points are continuously scanned, and if the status of a particular input point changes from that obtained during a previous scan, an address signal representative of that input point and the status thereof are stored in the temporary store 4. A set of stored information is read out from the temporary store 4 to make an access to the main memory 6, whereby information representative of the input point and information indicative of the status thereof which are read out from the main memory 6 are printed. Each time a printing operation is completed, a read-out from the temporary store 4 is again initiated for further printing until a stored information within the temporary store 4 is exhausted. As a result, even if a change in the status of a number of input points occur in succession, their data are all stored in the temporary store, thereby enabling the scanning operation to proceed without waiting for the completion of a printing operation to print out a change which occurred at a single input point. In this manner, changes of the status in close succession, a chain reaction of status changes as well as a rapid succession of status change occurring at a single input point can also be printed out. Since the apparatus effects a print-out only in response to the occurrence of a change in the status rather than a continuous print-out, a saving in the recording paper is achieved, and additionally the print-out result is rendered more legible. Since the print-out is made for the information representative of the input point and information indicative of the status thereof in terms of letters, numerals or other characters, the print-out output can be immediately recognized, thereby facilitating an analysis of the print-out output or a remedy action which must be taken. FIG. 8 shows one example of such print-out output. The four left-most columns 100 indicate a clock time, the center six columns 101 indicate the designation of the input point, and the three right-most columns 102 indicate the status of the input point. By way of example, the first row in the chart of FIG. 8 illustrates that the permissible maximum pressure of a drum 4DR of No. 4 boiler is exceeded (ON) at 9 o'clock 31 minutes, and the second row illustrates that such condition is changed to OFF or that the pressure has been reduced below the permissible maximum pressure at 10 o'clock 4 minutes. The third row illustrates that the liquid level in the drum of No. 4 boiler has fallen below the permissible minimum level LL at 11 o'clock 59 minutes, indicating an abnormality (ON). The expression "4AIR-H" in the fourth row indicates that the air supplied to No. 4 boiler together with the fuel is excessive. In this manner, the print-out output is provided in a form which allows a direct recognition of what is represented by a printed input point and how the status thereof is. It will be seen that the relationship between such information and the print-out output is such that for example, the memory element 1M of FIG. 4 stores a six bit binary code representing a letter 0, 2M a blank and 3M a letter N. When the choice of the input points are changed, it is readily possible to modify the stored content in the main memory 6 by replacement of the memory elements. By providing a representation on each memory element so that the stored content is recognizable by anyone, an unskilled person can perform a modification of the stored content. The use of a software is avoided, and the whole arrangement comprises merely a hardware, so that there is no need to make a program which requires an expert's skill, thereby enabling the apparatus to be readily handled and the maintenance simplified. When printing out information read out from the main memory 6, the use of a main memory such as disclosed in the above embodiment which is capable of maintaining a read-out output during the time it is being accessed or the use of the multiplexers so that the characters are supplied from the drive circuit 7 to the recorder 7 one character at a time permits the use of a buffer memory capable of storing the entire information read out from the main memory 6 in the event one row of print-out output involves a number of characters to be avoided and also permits the general arrangement to be provided inexpensively. In addition, the control circuit for the printer 9 is simplified.

Figure 9:
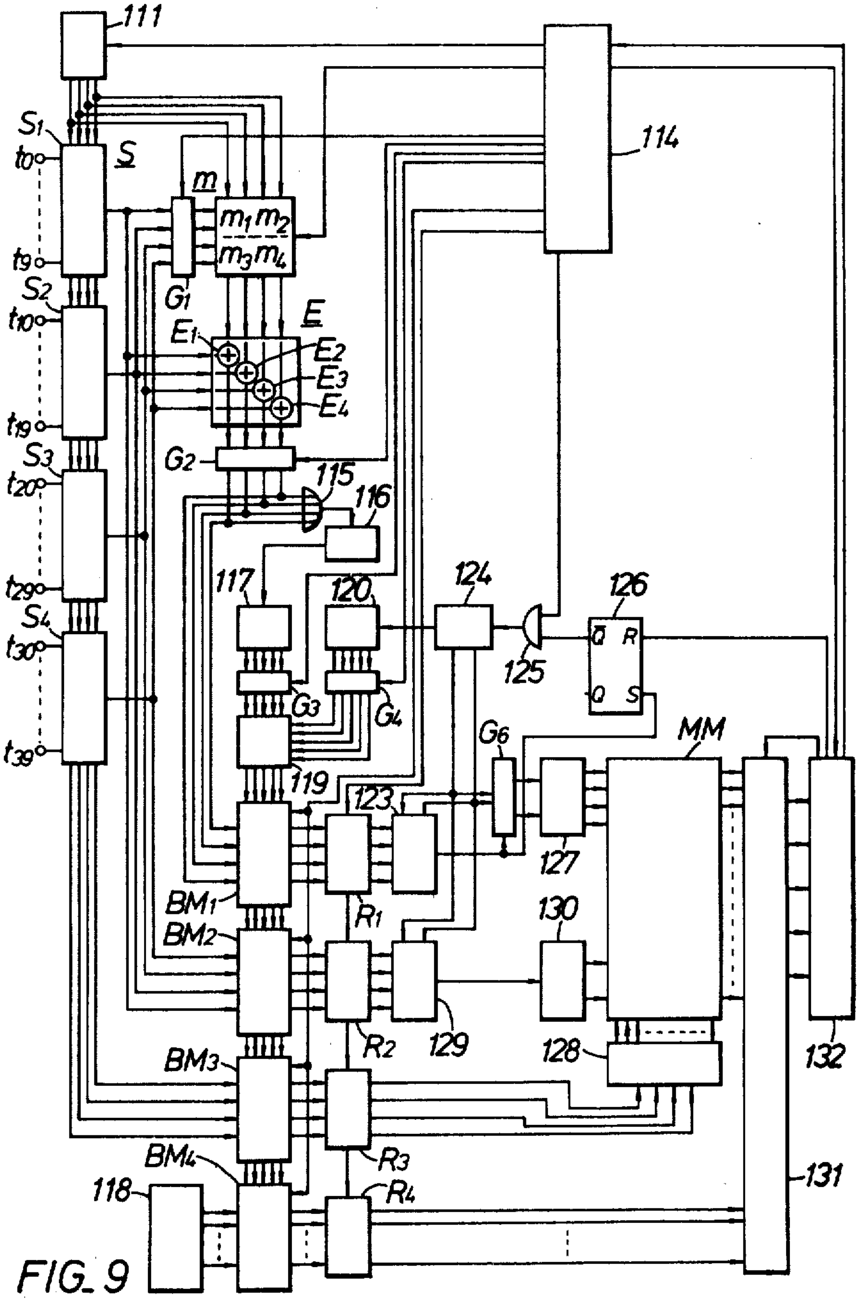
FIG. 9 is a block diagram showing another embodiment of the apparatus for monitoring a change in a multiplicity of inputs constructed in accordance with the invention.

While in the above description, the scanning circuit 1 successively scans input points, one point at a time, the multiplicity of input points may be divided into a plurality of groups which are scanned simultaneously, and an arrangement may be made so that upon occurrence of a change in the status of a particular input point, the address and the status of corresponding input points in the groups being scanned can be simultaneously stored in a temporary manner. FIG. 9 shows such an arrangement in which input points $t_0$ to $t_{39}$ are divided into four groups each including $t_0$ to $t_9$, to $t_{19}$, $t_{20}$ to $t_{29}$ and $t_{30}$ to $t_{39}$. These groups are simultaneously scanned by sub-circuits $S_1$, $S_2$, $S_3$ and $S_4$ of the scanning circuit S, each of which effects a sequential scanning. The scanning is controlled by a scan counter 111. The scanned outputs are stored in an update memory *m*. The output of the scan counter 111 is used as an address to store the scanned output for each input point in respective regions *m*1, *m*2, *m*3 and *m*4 of the memory *m*. Before being stored, the scanned ouptut is compared against the stored content in the memory *m* which corresponds to a particular input point. Sepcifically, the outputs from the scanning sub-circuits $S_1$, $S_2$, $S_3$ and $S_4$ are supplied to exclusive OR circuits $E_1$ to $E_4$ of a comparison circuit E, while the output of the scan counter 111 is used as an address to make an access to the respective memory regions of the update memory *m*, thereby supplying to the exclusive OR circuits $E_1$ to $E_4$ the stored content which correspond to the input points being scanned in the current cycle. The comparison circuit E determines whether or not there is a change between the scanned outputs of the previous and current scans for each input point. Subsequent to such determination, the status of the input point from the respective scanning sub-circuits is passed through a gate $G_1$ which is opened by a control circuit 114 and stored in a corresponding memory region of the update memory *m* at its associated address. Specifically, during an interval a single input point is connected with the scanning sub-circuit, the comparison is made in the comparison circuit E during first half of the interval, while the status of that input point is stored in the memory *m* during the second half of the interval. Subsequently, the scan counter 111 is advanced one step. The scan counter 111 is controlled by a control circuit 114. A gate $G_2$ connected with the output of the comparison circuit E is controlled by the control circuit 114 to pass an output therefrom which is obtained during the time a comparison is made between the stored content of the previous scan and the scanned output of the current cycle, which output is supplied to a buffer memory $BM_1$. At the same time, the outputs of the comparison circuit E corresponding to the four scanning sub-circuits are passed through an OR circuit 115 to provide a single pulse which is fed to a monostable multivibrator 116, thereby advancing an address counter 117 associated with the buffer memory BM by one step. Thus, when an output is obtained from the comparison circuit E, the counter 117 is advanced one step, and the content of the counter 117 is fed as an address to the buffer memory $BM_1$ through an OR circuit 119 only when a gate $G_3$ is opened, thereby storing the outputs from the comparison circuit E for each scanned group. Similarly, the prevailing outputs of the scanning circuit S are stored in a buffer memory $BM_2$ for each scanned group with the content of the counter 117 being used as an address. Additionally, the prevailing content of the scan counter 111 is stored in a buffer memory $BM_3$, and the clock time supplied as a digital signal from a clock 118 is stored in a buffer memory $BM_4$.

A read-out of the buffer memories $BM_1$ to $BM_4$ is effected by a read-out counter 120 in the sequence of entry which is based on the content of the counter 117. The read-out operation takes place by opening a gate $G_4$ with a signal from the control circuit 114 and passing an address from the counter 120 to the buffer memories $BM_1$ to $BM_4$ through the OR circuit 119. The control circuit 114 supplies a write/read instruction to the buffer memories $BM_1$ to $BM_4$ through a lead wire 121. The informations read out from the respective buffer memories $BM_1$ to $BM_4$ at a single address are stored in registers $R_1$ to $R_4$, respectively. The write in and read out from the registers $R_1$ to $R_4$ are controlled by the control circuit 114.

The four outputs from the register $R_1$ corresponding to the sub-circuits $S_1$ to $S_4$ are fed to a multiplexer 123 which outputs these four inputs sequentially in response to an output from a counter 124 having a scale of four. A clock is supplied to the counter 124 from the control circuit 114 through a gate 125. When the multiplexer 123 outputs 1, indicating non-coincidence of the status between the previous and current cycles, a flip flop 126 is set, its output closing a gate 125. In response to an output from the multiplexer 123, the prevailing output of the counter 124 is supplied through a gate $G_6$ to a drive circuit 127 in which the signal from the counter 124 is decoded before being supplied to a main memory MM. At the same time, the addresses of the respective groups are supplied from the register $R_3$ to a drive circuit 128 where they are decoded before being supplied to the main memory MM. The address signals from these drive circuits 127 and 128 are used to make an access to the main memory MM. Thus, information representative of the designation of the input point is read out. In addition, the output of the register $R_2$ is supplied to a multiplexer 129 which is controlled by the counter 124, so that the status of corresponding input points are obtained from the multiplexer 129, and the output is decoded in a drive circuit 130 and supplied to the main memory MM, thereby causing the prevailing status to be read out. The information read out of the main memory MM representative of the designation and the status of the input points as well as the clock time signal from the register $R_4$ are accumulated in an output circuit 131. The accumulated information is subsequently printed out by a printer 132. Upon completion of the print-out, the printer 132 issues a complete signal which resets the flipflop 126, advancing the counter 124. In his manner, only those of information concerning four input points in the four groups and stored in the registers $R_1$ to $R_4$ in which a change in the status occurred are printed out. When the content of the registers $R_1$ to $R_4$ is read out in this way, the counter 124 reaches its full count to be reset, whereupon the resulting output causes the read-out counter 120 to be stepped. Then the count in the counter 120 provides an address which is used to effect a read-out of information corresponding to one address from the buffer memories $BM_1$ to $BM_4$ into the registers $R_1$ to $R_4$.

In the embodiment shown in FIG. 9, the temporary store or buffer memories $BM_1$ to $BM_4$ may comprise first-in, first-out memory previously described in connection with FIG. 2. In the arrangement of FIG. 1, a clock time signal from the clock may also be stored in the temporary store 4 upon occurrence of a change in the status, thereby allowing an accurate time indication to be printed out. The clock time signal may be made precise enough to include a micro-second component, which can also be printed out. It should be understood that the recorder 9 is not limited to a printer, but may be replaced by any other conventional recording equipment. In an alternative arrangement employing a high speed recorder 9, the temporary store 9 may be omitted, and a recording operation be performed upon detection of a change in the status of an input point so as to advance the scanning operation when the recording operation is completed.

Having described the invention, what is claimed is:

1. An apparatus for monitoring a change in a multiplicity of inputs and comprising a scanning circuit for successively scanning a multiplicity of input points and for outputting binary information indicative of the status of each input point; an update memory for storing the scanned output corresponding to each input point; a comparison circuit for comparing the scanned output of a current cycle against the scanned output of the corresponding input points which was stored during a previous cycle in the update memory, thereby detecting any change in the status of the respective input points; a main memory including a plurality of memory elements which are detachable mounted on a printed substrate and each capable of outputting, when accessed, a binary code indicative of a letter, symbol, numeral or the like which is externally indicated on the memory element, the main memory thus carrying information indicative of the content of the individual input points which are stored in the plurality of memory elements; read-out means responsive to the detection of a change in the comparison circuit for making an access to the main memory at an address corresponding to the input point for which the change is detected; and a recorder for recording the information read out of the main memory and the status of the corresponding input point.

2. An apparatus according to claim 1, wherein the scanning circiut is supplied with address information to scan the multiplicity of inputs in a sequential order and which further includes a temporary store for storing an address information and a prevailing status of each input point for which the comparison circuit provides a detection of a change in the status, the information read out of the temporary store being used as the address information for accessing the main memory.

3. An apparatus according to claim 2 in which the temporary store comprises a store of the type in which information is read out in the sequence it is entered.

4. An apparatus according to claim 1, further including a clock for producing a clock time signal, the recorder also recording the clock time when a change in the status occurred.

5. An apparatus according to claim 1 in which the main memory maintains information read out therefrom during a time interval it is being accessed, and further including means for supplying the information read out from the main memory to the recorder one character at a time.

6. An apparatus according to claim 1 in which the main memory is arranged so that it continues to output information to be read out during the time it is being accessed, and further including a plurality of multiplexers each receiving a bit at a corresponding position from a plurality of binary codes indicative of letters (inclusive of symbols, numerals and the like) which are read out of the main memory in a block, and means for deriving one bit from each of the multiplexers to form a letter which is supplied to the recorder, and for controlling the multiplexers each time the letter is recorded by the recorder to derive a next letter from the multiplexers, thus supplying the entire information relating to an input point to the recorder.

7. An apparatus for monitoring a change in a multiplicity of inputs from a plurality of groups of input points, each group including a plurality of input points, the apparatus comprising; a plurality of scanning circuits for simultaneously scanning the groups of input points; an update memory for storing the scanned output of each input point; a comparison circuit for comparing the scanned output during a current cycle against the scanned output of the corresponding input points which are stored during a previous cycle in the update memory, thereby detecting any change therebetween; a main memory including a plurality of memory elements which are detachable mounted on a printed substrate and each capable of outputting, when accessed, a binary code indicative of a letter, symbol, numeral or the like which is externally indicated on the memory element, the main memory thus carrying information indicative of the content of the individual input points which are stored in the plurality of memory elements; means operable, upon detection of a change by the comparison circuit, to access the main memory at an address corresponding to the input point for which the change is detected and a recorder for recording information read out from the main memory by the access means.

8. An apparatus for monitoring a change in a multiplicity of inputs from a plurality of groups of input points, each group including a plurality of input points, the apparatus comprising: a like plurality of scanning circuits for simultaneously and sequentially scanning the corresponding input points of the respective groups; an update memory for storing the outputs of the respective scanning circuits corresponding to each of the input points; a plurality of comparison circuits for comparing the scanned output of each of the respective scanning circuits obtained during a current cycle against the corresponding scanned output of the corresponding input points which was stored during a previous cycle, thereby detecting any change in the status of the respective input points; a temporary store, operable upon detection of a change in at least one comparison circuit, to store the address information and prevailing status of those input points which are being fed to the respective comparison circuits; a register for maintaining information read out of the temporary store; means for reading out the content of the register for each of the groups, thereby obtaining the address information and status of a particular input point; a main memory for storing information indicative of the designation and status of the respective input points, the address information and the status obtained from the read-out means being used to make an access to the main memory, said main memory including a plurality of memory elements which are detachably mounted on a printed substrate and each capable of outputting, when accessed, a binary code indicative of a letter, symbol, numeral or the like which is externally indicated on the memory element, the main memory thus carrying information indicative of the content of the individual input points which are stored in the plurality of memory elements; and a recorder for recording information read out of the main memory.

* * * * *